United States Patent [19]

Inoue et al.

[11] Patent Number: 5,307,340
[45] Date of Patent: Apr. 26, 1994

[54] MULTIPATH TRANSMISSION SYSTEM WITH A TROUBLESHOOTING ARRANGEMENT FOR DETECTING FAILURE

[75] Inventors: Kiyoshi Inoue; Kyosuke Hashimoto; Yutaka Matsuda; Shoji Hara; Kunio Odaka, all of Hiratsuka; Seiji Hirano, Hiroshima; Osamu Michihira, Hiroshima; Yoshikazu Nobutoki, Higashihiroshima, all of Japan

[73] Assignee: The Furukawa Electric Co., Ltd., Tokyo, Japan

[21] Appl. No.: 815,922

[22] Filed: Dec. 30, 1991

[30] Foreign Application Priority Data

Apr. 2, 1991 [JP] Japan ................... 3-070028

[51] Int. Cl.[5] ............................................. H04J 3/14
[52] U.S. Cl. ........................... 370/13; 370/85.3; 370/85.13
[58] Field of Search ............. 370/85.13, 13, 13.1, 370/14, 15, 94.1, 58.1, 17; 340/825.5

[56] References Cited

U.S. PATENT DOCUMENTS

| | | | |
|---|---|---|---|
| 4,747,097 | 5/1988 | Ohya et al. | 370/16 |
| 4,831,617 | 5/1989 | Iwasaki | 370/13 |
| 4,841,520 | 6/1989 | Steely | 370/13 |
| 4,926,417 | 5/1990 | Futami et al. | 340/825.5 |
| 4,964,076 | 10/1990 | Schurk | 340/825.5 |
| 5,079,765 | 1/1992 | Nakamura | 370/85.13 |
| 5,090,012 | 2/1992 | Kajiyama et al. | 370/85.3 |

FOREIGN PATENT DOCUMENTS 0399491 11/1990 European Pat. Off. .
3810367 10/1989 Fed. Rep. of Germany .
4110372 10/1991 Fed. Rep. of Germany .

OTHER PUBLICATIONS

IEEE Spectrum, vol. 23, No. 6, Jun. 1986, New York, N.Y., R. K. Jurgen, "Coming From Detroit: Networks On Wheels", pp. 53-59.

*Primary Examiner*—Douglas W. Olms
*Assistant Examiner*—Shick Hom
*Attorney, Agent, or Firm*—Frishauf, Holtz, Goodman & Woodward

[57] ABSTRACT

A multipath transmission system according to the present invention comprises a plurality of multiplex nodes connected to two multiplex buses. Each of the multiplex nodes is assigned to a specific apparatus, and includes a communication control circuit (LSI) for fetching multiplex signals from the apparatus and transmitting the multiplex signals to the multiplex buses. One multiplex node, out of the plurality of multiplex nodes, includes communication control circuits driver/receiver circuits, and troubleshooting driver/receiver circuits, which are connected to the multiplex buses and used for signal transfer between the buses, and a microprocessor for troubleshooting the multiplex buses and the multiplex nodes. The multiplex node relays a failure signal, corresponding to the result of troubleshooting, to the other network which suffers no trouble.

16 Claims, 4 Drawing Sheets

मल्टीPATH TRANSMISSION SYSTEM WITH A TROUBLESHOOTING ARRANGEMENT FOR DETECTING FAILURE

BACKGROUND OF THE INVENTION

1. Field of the Invention

The present invention relates to a multipath transmission system for transferring signals between multiplex nodes connected to a plurality of networks, and more particularly, to a multipath transmission system for system troubleshooting.

2. Description of the Related Art

Some of multipath transmission systems of this type are used in a system which includes two networks with different response characteristics (e.g., transmission speed). In these first and second networks, a plurality of multiplex nodes transmit signals, such as data, to each other through multiplex buses, thereby effecting independent control.

One of the multiplex nodes constitutes an element common to both networks. This common node has a function as a gateway for relaying signals used in common in the two networks, as well as a communication facility for signal transmission. This multiplex node will hereinafter be referred to as gateway node.

A specific multiplex node in each network periodically transmits signals to the network to which it belongs. This specific node checks reception response signals from the individual multiplex nodes. Alternatively, the specific multiplex node checks to see if the other multiplex nodes are normally operating by periodically transmitting signals to the nodes.

In case of a failure in one of the multiplex nodes, the specific multiplex node infers an occurrence of some trouble from the absence of response signals, transmission failure, etc. if the defective node is in the same network as the specific multiplex node. If the defective node is in the other network to which the specific multiplex node does not belong, the specific node cannot detect it at all. In this multipath transmission system, the control method for each node must be changed, so that the other network should be informed of the details of the failure.

The following is a description of the operation of the system which is supposed to be performed when a certain multiplex node in the first network is disabled from communication due to a failure. First, the specific multiplex node in the first network detects the disabled state of the defective multiplex node by periodic inspection, and then immediately transmits a signal indicative of the occurrence of the failure in the defective node to the first network. On receiving this failure signal, the gateway node relays it to each multiplex node in the second network. Thus, the control method for each multiplex node in the second network can be also changed. The multiplex nodes in the first network can also utilize the failure signal, and the failure, having occurred in the same network, can be detected by any other suitable means. The operation of the system can be supposed to be performed in like manner when the defective multiplex node is in the second network. More specifically, in this case, the specific multiplex node in the second network detects the failure, and the gateway node relays a failure signal to the first network.

The specific multiplex node comprises an emergency communication device and a troubleshooting device, and periodically checks to see if multiplex transmission lines (hereinafter referred to as multiplex buses) are normal. The emergency communication device can perform communication even if one wire of a twisted pair cable, which constitutes each transmission line, is shorted. The troubleshooting device can perform communication only when both wires of the cable are normal. When the specific multiplex node finds, through the periodic inspection, a failure in the network to which it belongs, it turns on an alarm lamp in a meter, for example, thereby informing an operator of the failure. The specific multiplex node may be designed so that it can remember the occurrence of a failure if the failure is a relatively safe one, and can output failure record information when the system is inspected later in a repair shop or the like.

If the communication facility of the gateway node suffers a failure, in this multipath transmission system, a failure signal cannot be relayed to the other network. This is because a relaying function is given to the very gateway node in trouble. Despite the occurrence of the failure, therefore, the control method for each multiplex node in the other network cannot be properly changed. If any of the multiplex buses suffers a failure, that is, if a connector which connects the multiplex bus and its corresponding multiplex node is disengaged, or if the two wires of the bus is shorted, for example, no failure signal is delivered, so that the control method for each multiplex node in the other network cannot be properly changed, as in the aforesaid case.

SUMMARY OF THE INVENTION

The present invention has been contrived in consideration of these circumstances, and its object is to provide a multipath transmission system, capable of securely troubleshooting one network and securely relaying a failure signal to another network, thereby ensuring high-reliability multipath transmission.

The above object is achieved by a multipath transmission system according to the present invention, which comprises transmission lines constituting at least two networks, and a plurality of multiplex nodes connected to the transmission lines, each of the multiplex nodes including communication means for signal transmission through the transmission lines belonging to an identical networks, at least one specific multiplex node, out of the plurality of multiplex nodes, including communication means connected to the two or more transmission lines and used for signal transfer between the transmission lines, and troubleshooting means for troubleshooting the connected transmission lines and the multiplex nodes connected to the transmission lines.

According to the multipath transmission system described above, the transmission lines constitute two or more networks, and each multiplex node is connected to one of the transmission lines to transmit signals through the same transmission line. The multiplex node which is connected to the transmission lines constituting a plurality of networks troubleshoots the transmission lines and the multiplex nodes, and transmits the result of troubleshooting, as required, to a network for the same or another line. Thus, the occurrence of a failure in one network can be secured detected, and the control method for each multiplex node can be properly changed, so that the reliability of the multipath transmission can be improved.

The above and other objects, features, and advantages of the invention will be more apparent from the ensuing detailed description taken in connection with the accompanying drawings.

DETAILED DESCRIPTION OF THE PREFERRED EMBODIMENTS

Figure 1:
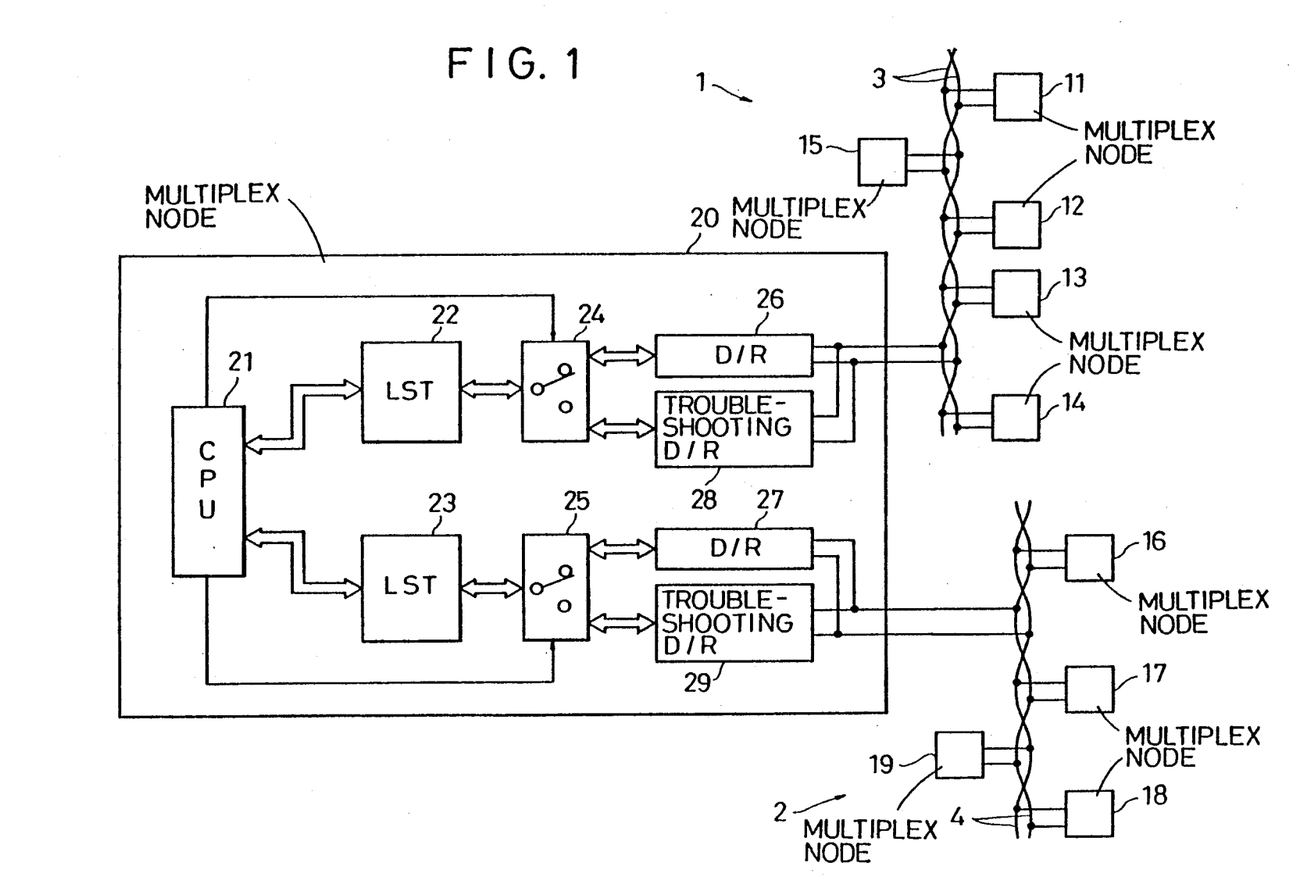
FIG. 1 is a block diagram showing a multipath transmission system according to one embodiment of the present invention.

Referring to FIG. 1, there is shown a multipath transmission system which comprises networks 1 and 2 of two different systems. In the first network 1, multiplex nodes 11 to 15 and 20 transmit signals to each other through multiplex buses 3. In the second network 2, a plurality of multiplex nodes 16 to 20 transmit signals to one another through multiplex buses 4. These networks 1 and 2 are controlled independently of each other.

In the gateway node 20, a microprocessor (CPU) 21 for general process control is connected with two communication control circuits (LSI's) 22 and 23, which are each composed of a multipath transmission control IC for the control of transfer between the networks, buffers for transmission and reception, an interface, etc. A driver/receiver circuit (hereinafter referred to as D/R) 26 and a troubleshooting D/R 28 are connected to the LSI 22 through a switch 24. Also, a D/R 27 and a troubleshooting D/R 29 are connected to the LSI 23 through a switch 25.

The switch 24, which is used to connect the D/R 26 or the troubleshooting D/R 28 to the LSI 22, is shifted by means of the CPU 21. Likewise, the switch 25, which is used to connect the D/R 27 or the troubleshooting D/R 29 to the LSI 23, is shifted by means of the CPU 21.

The D/R's 26 and 27 are circuits for interfacing between the multiplex buses 3 and 4 and the LSI's 22 and 23, respectively. The D/R's 26 and 27 are designed so that communication can be secured even when the multiplex buses suffer a short-mode failure.

The troubleshooting D/R's 28 and 29, like the D/R's 26 and 27, are circuits for interfacing between the multiplex buses 3 and 4 and the LSI's 22 and 23, respectively. The D/R's 28 and 29 are designed so that transmission or reception of signals to or from the individual multiplex nodes is allowed only when both wires of each multiplex bus, which is formed of a twisted pair cable, are normal.

The CPU 21 sets the switches 24 and 25 so that the D/R's 26 and 27 are normally selected. Further, the CPU 21 periodically shifts the switches 24 and 25, and causes the troubleshooting D/R's 28 and 29 to check to see if the transmission and reception of signals are normally performed. If signals cannot be transferred between the troubleshooting D/R 28 or 29 and its corresponding network, the CPU 21 concludes that one of the twisted wires of the multiplex bus 3 or 4 is in trouble.

Thus, according to the present embodiment, the spot of failure can be detected by means of a troubleshooting function based on the transmission and reception of signals, using the troubleshooting D/R's 28 and 29, even in case of disconnection of connectors, which connect the multiplex buses and the multiplex nodes, or a short circuit in the twisted pair cable, for example.

The CPU 21 has a function to periodically monitor the operations of the networks 1 and 2, besides its original control function. More specifically, the multiplex node 20 periodically transmits signals to the networks 1 and 2, and checks reception response signals from the multiplex nodes (including a reception response signal of its own) to see if the individual multiplex nodes are normally operating. Alternatively, the multiplex node 20 checks to see if the multiplex nodes are normally operating by periodically transmitting specific signals to the individual nodes, for example.

Figure 2:
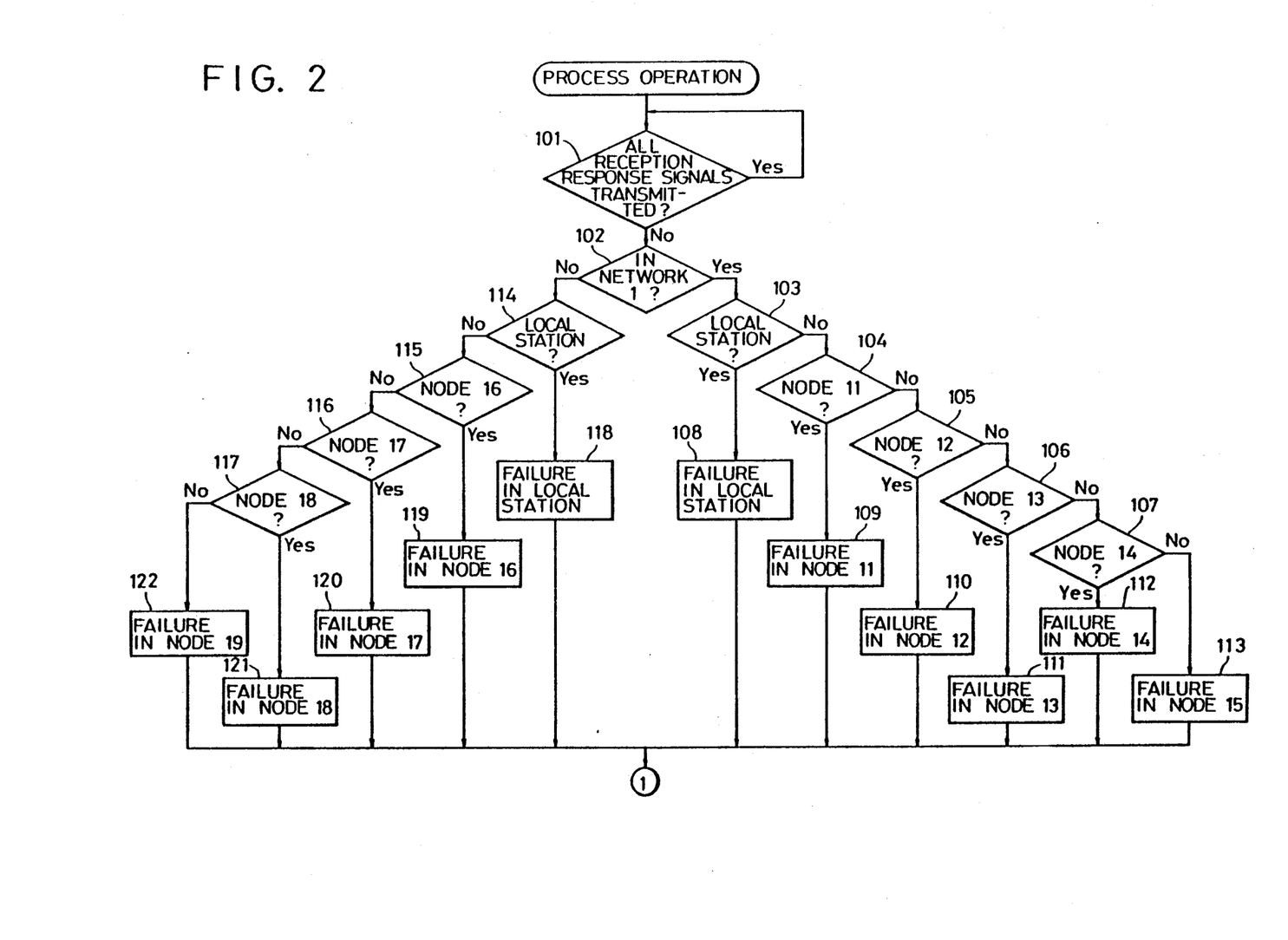
FIGS. 2 and 3 are flow charts for illustrating troubleshooting operation processes for a gateway node shown in FIG. 1.
Figure 3:
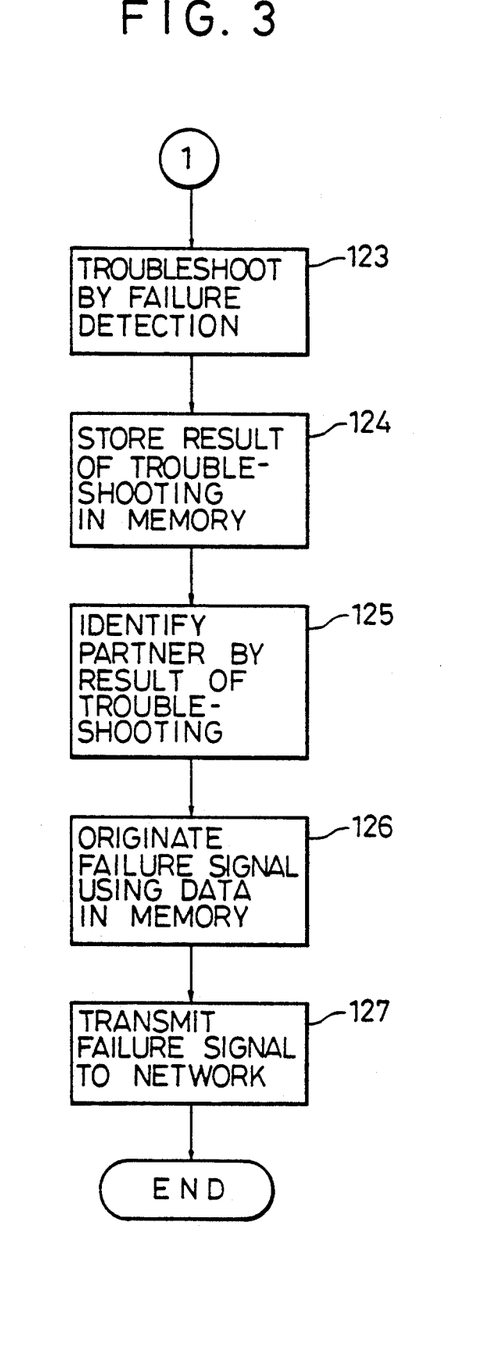

FIGS. 2 and 3 are flow charts for illustrating network troubleshooting operation performed by means of the gateway node 20.

Referring to FIG. 2, the LSI's 22 and 23 periodically receive response signals from all the multiplex nodes including the respective local stations of the two networks 1 and 2 in accordance with the operation control of the CPU 21. Then, the LSI's 22 and 23 cause reception buffers for the networks to store these reception signals as reception data from all the multiplex nodes. The CPU 21 fetches the reception data and determines whether or not the transmission of the reception signals from all the multiplex nodes is effected (Step 101). If no response signal is transmitted from any of the multiplex nodes, the CPU 21 identifies the network in which the response signal is not transmitted (Step 102).

If the network without the response signal transmission is the network 1, the CPU 21 then discriminates the multiplex node which transmits no response signal, in accordance with the fetched response signal (Steps 103 to 107). This discrimination is made on the basis of ID data (data composed of addresses indicative of local stations, i.e., the individual multiplex nodes of the network 1, addresses indicative of destinations, data lengths, etc.) of the reception response signals. Based on the result of this discrimination, the CPU 21 identifies the multiplex node, among the multiplex nodes 11 to 15 and 20, from which the fetched reception response signal comes (Steps 108 to 113). If the network without the response signal transmission is the network 2, on the other hand, the CPU 21 discriminates the multiplex node which transmits no response signal, in accordance with the ID data (data including addresses indicative of the local stations, i.e., the individual multiplex nodes of the network 2, addresses indicative of destinations, data lengths, etc.) of the fetched response signal (Steps 114 to 117), in the same manner as aforesaid. Based on the result of this discrimination, the CPU 21 identifies the multiplex node, among the multiplex nodes 16 to 20, from which the fetched reception response signal comes (Steps 118 to 122).

Referring to FIG. 3, the CPU 21 identifies the multiplex node which transmits no response signal in Steps 108 to 113 and Steps 118 to 122, whereupon it troubleshoots in response to a detection of failure (Step 123). Then, the CPU 21 writes and stores the result of this troubleshooting in its internal memory, as a failure history of the multiplex node concerned (Step 124). In response to the result of this troubleshooting, moreover, the CPU 21 discriminates the multiplex node which requires a failure signal (Step 125). Using the troubleshooting result data stored in the internal memory, furthermore, the CPU 21 produces a failure signal which is composed of ID data and data corresponding to the result of the troubleshooting. Then, the failure signal is written in the respective network transmission buffers of the LSI's 22 and 23 (Step 126).

When the failure signal is written in the transmission buffers, the LSI's 22 and 23 transmit the signal in the buffers to the multiplex nodes (all the multiplex nodes except the one in trouble) of the networks 1 and 2 which require this failure signal, in accordance with the ID data (Step 127). This transmission of the failure signal may be executed for the other network after being executed for the one in trouble. Since each multiplex node can independently detect failure in its corresponding network, the failure signal may be transmitted only to the network which is not in trouble. When the transmission of the failure signal is finished, the CPU 21 terminates this process operation.

According to the present invention, therefore, if the communication function of the gateway node 20 for the network 1, for example, goes wrong, the node 20 can detect its own failure in the communication function by periodic inspection, as in the case of failure in any other multiplex node, and immediately transmit a failure signal to the network 2.

Figure 4:
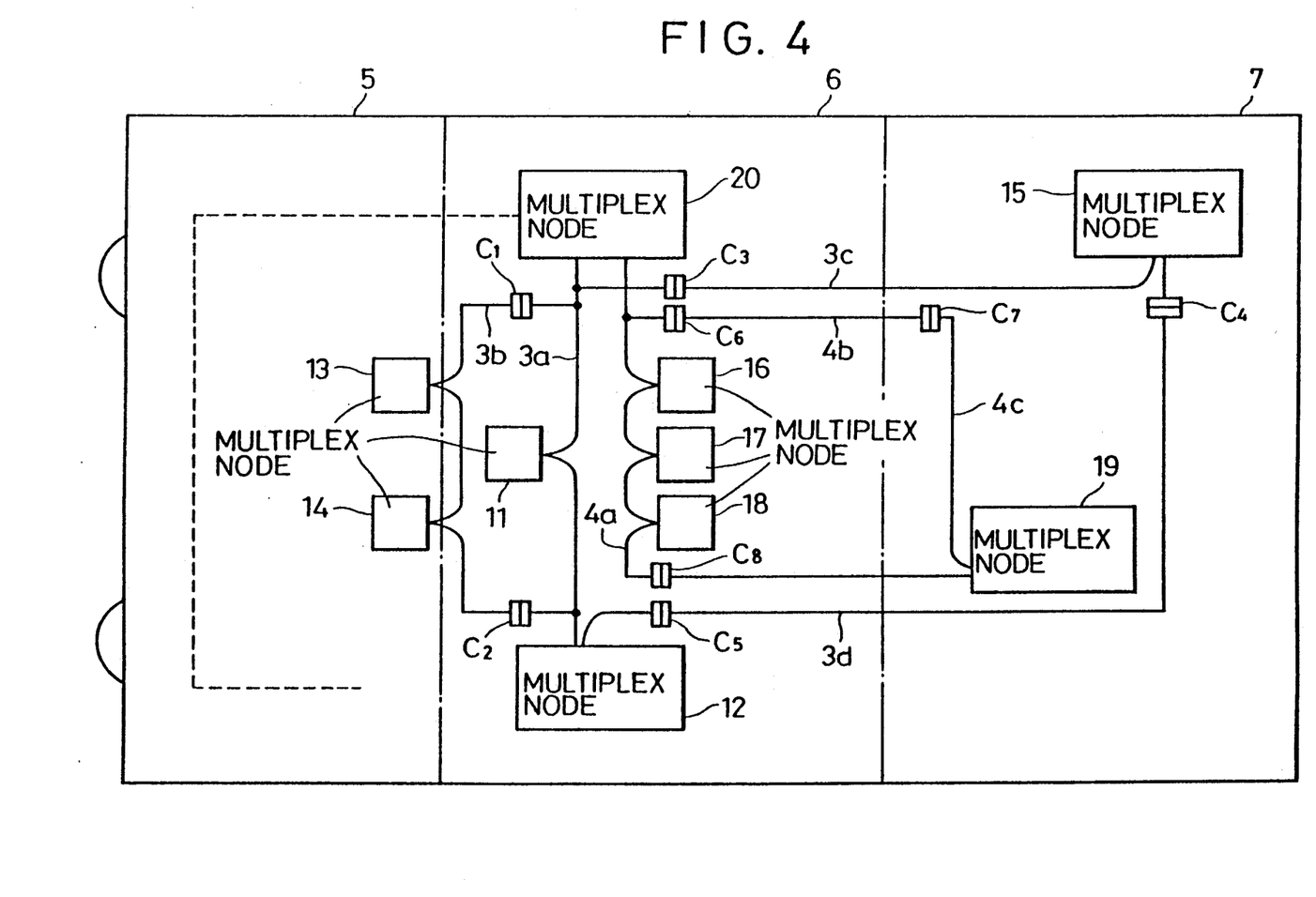
FIG. 4 is a block diagram showing a specific layout of the multipath transmission system incorporated in an automobile and is a block diagram showing the multipath transmission system according to invention.

FIG. 4 is a block diagram showing a specific layout of the multipath transmission system of FIG. 1 incorporated in an automobile. In FIG. 4, numerals 5, 6 and 7 denote an engine compartment, a driver's cab, and a trunk compartment, respectively, which are divided from one another by dashed lines.

Referring to FIG. 4, the multiplex buses 3a to 3d and 4a to 4c, which are each formed of a twisted pair cable or the like, are connected to one another by means of connectors C1 to C8, and are arranged in two loops for balanced signal transmission.

The multiplex bus 3a, which is incorporated in a wire harness which passes through, for example, the dashboard in the driver's cab 6, is connected with the multiplex nodes 11, 12 and 20 which are control units with a communication function. The multiplex bus 3b, which is incorporated in a wire harness which passes through, for example, the instrument panel, is connected with the multiplex nodes 13 and 14 which also have a communication function. The multiplex bus 3c, which is incorporated in a wire harness which passes through, for example, a floor portion beside the seats, is connected with the multiplex node 15 which also has a communication function. The multiplex bus 3d is incorporated in a wire harness which passes through, for example, a floor portion beside the seats and the floor of the trunk compartment 7.

Thus, the multiplex nodes 11 to 15 and 20 and the multiplex buses 3a to 3d constitute the first network. The multiplex nodes 11 to 15 and 20 have the same response characteristic, and signals can be transferred at least between them by communication through the multiplex buses 3a to 3d.

The multiplex bus 4a, which is incorporated in a wire harness which passes through, for example, the dashboard, is connected with the multiplex nodes 16 to 18 and 20 which also have a communication function. The multiplex bus 4c, which is incorporated in a wire harness which passes through, for example, a floor portion beside the seats and the floor of the trunk compartment 7, is connected with the multiplex node 19 which also has a communication function.

Thus, the multiplex nodes 16 to 20 and the multiplex buses 4a to 4c constitute the second network. The multiplex nodes 16 to 20 have the same response characteristic (different from that of the multiplex nodes 11 to 15), and signals can be transferred at least between them by communication through the multiplex buses 4a to 4c.

In this system arrangement, the first network, for example, is used for the transmission of signals from switches operated by a driver, control signals for actuators produced in response to the switch signals, and the like. The second network, for example, is used for the transfer of signals at least between various multiplex nodes, such as the engine, transmission gear, suspension system, braking system, etc., which requires a relatively high reliability.

The system thus furnished with the networks of the two types requires troubleshooting faculty and a measure to counter failure in the multiplex nodes or multiplex buses. Since the transfer of the signals associated with the control of the engine, braking system, etc. requires high reliability, moreover, a higher-performance troubleshooting function is essential to the system. According to a method of fulfilling the troubleshooting function, for example, the driver is warned of a failure when it is detected, and the control of the engine, braking system, etc. is switched to an emergency control mode in which no networks are used.

The gateway node 20 is a control unit connected to or contained in a joint box which is located beside the instrument panel. The joint box is connected with a plurality of wire harnesses which are arranged in the vehicle. In this example, the joint box is connected with the respective end portions of the wire harness in the dashboard, in which the multiplex buses 3b and 4a are incorporated, the wire harness in the instrument panel, in which the multiplex bus 3a is incorporated, and the wire harness connected to electric apparatuses in the engine compartment 5, as indicated by broken line in FIG. 4.

Signal lines (including multiplex buses) in the connected wire harnesses are connected to branch circuits, which are formed of bus bars in the joint box, and are branched off to the multiplex node 20 which is contained in (or connected to) the joint box. Some of the signal lines, which need not be branched off, are connected directly to the multiplex node 20 without using the bus bars.

Power lines in the connected wire harnesses are arranged in the same manner as the signal lines. Some of the power lines are protected against a short circuit or other failure by means of fuses in the joint box.

Switching elements (relays and transistors) are also mounted in the joint box or the multiplex node 20, and the respective circuits of some of the electric apparatuses are switched by means of these switching elements.

The multiplex node 20, which can receive signals from the wire harnesses or through the multiplex buses, serves to drive the electric apparatuses by controlling the switching elements in accordance with the signals and to transmit the signals to the other multiplex nodes through the multiplex buses.

This network troubleshooting function is given to the multiplex node 20 contained in (or connected to) the joint box because the joint box is connected with many wire harnesses for various functions, such as protection of the power source, distribution of power and signals, etc. Another reason is that many of those wire harnesses which cannot be connected directly to the joint box are connected to the wire harnesses which are connected directly to the joint box in close vicinity thereto. In the example shown in FIG. 4, these wire harnesses correspond to the ones which incorporate the multiplex buses 3c and 4b and pass through the floor portion beside the driver's seat. These wire harnesses cannot be connected directly to the joint box which contains the multiplex node 20. In the region very close to the joint box, however, these wire harnesses are connected individually to wire harnesses, which incorporate the multiplex buses 3a and 4a, by means of connectors C3 and C6.

Thus, in many cases, the wire harnesses which incorporate the multiplex buses of the networks are connected directly to or arranged very close to the multiplex node 20. Therefore, the multiplex node 20 can be efficiently provided with a function to relay signals of the networks by only connecting the multiplex buses incorporated in those wire harnesses which are already connected to or arranged in close vicinity to the node 20.

Let us suppose a case, for example, that some new multiplex nodes are arranged in the engine compartment 5 to form another network in the arrangement of FIG. 4. In this case, the multiplex nodes of this network is incorporated in the wire harness indicated by broken line in FIG. 4. Since this wire harness is already connected, the multiplex node 20 can be connected to the additional network to enjoy a relaying function by only divergently connecting the multiplex buses to the node 20.

In connecting the multiplex buses to other multiplex nodes having the relaying function, new multiplex buses must be incorporated in many wire harnesses. As compared with this case, as seen from the above description, the efficiency can be promoted by providing the multiplex node 20 with the relaying function. Thus, the multiplex node 20 can be regarded as an optimum node for the relaying function, and therefore, as a multiplex node for the troubleshooting function for both networks.

According to the multipath transmission system of the present invention, as described above, the multiplex node having the gateway function is provided with the troubleshooting function, so that a failure signal can be transmitted to the normal network in case of failure. Accordingly, the control method for each multiplex node can be properly changed.

Further, the gateway node can grasp all the transmission and reception signals in the data transmission system, and directly obtain the data transmitted through the multiplex buses. Accordingly, the necessary failure signal can be securely relayed to the other network by giving the troubleshooting function to the gateway node. Thus, extra failure information cannot be transmitted, and the system can be totally troubleshooted.

According to the present embodiment, moreover, part of an algorithm for troubleshooting can be used in common by concentrating the troubleshooting function on the one gateway node, so that the total load on the multiplex nodes can be reduced.

Thus, according to the multipath transmission system of the present invention, high-reliability multipath transmission can be effected, so that the efficiency of data transmission can be improved.

What is claimed is:

1. A multipath transmission system used for multipath transmission of multiplex signals to or from various apparatuses, comprising:
    transmission lines constituting at least two networks; and
    a plurality of multiplex nodes connected to said transmission lines, each of said plurality of multiplex nodes including communication means for signal transmission through said transmission lines belonging to an identical network of said at least two networks,
    at least one specific multiplex node, out of said plurality of multiplex nodes, including communication means connected to said transmission lines constituting at least two networks for relaying signals between said transmission lines of said at least two networks, and troubleshooting means for troubleshooting the connected transmission lines and said plurality of multiplex nodes connected to said transmission lines;
    wherein said communication means of said at least one specific multiplex node includes:
    a first driver/receiver circuit for communication with the other multiplex nodes in case of a short in the connected transmission lines, and
    a second driver/receiver circuit for communication with the other multiplex nodes only when the connected transmission lines are normal; and
    wherein said troubleshooting means periodically controls switching between the first driver/receiver circuit and the second driver/receiver circuit, and troubleshoots the connected transmission lines if signal transmission is not allowed when the system is switched to the second driver/receiver circuit.

2. A multipath transmission system according to claim 1, wherein said transmission lines are combined in a paired configuration to transmit said multiplex signals.

3. A multipath transmission system according to claim 1, wherein said troubleshooting means periodically transmits specific signals to the connected transmission lines, receives reception response signals from the multiplex nodes corresponding thereto, and troubleshoots the multiplex nodes depending on the presence of the reception response signals received.

4. A multipath transmission system according to claim 1, wherein said troubleshooting means periodically causes specific signals to be transmitted from the multiplex nodes, and troubleshoots the multiplex nodes depending on the presence of the specific signals transmitted.

5. A multipath transmission system according to claim 1, wherein said troubleshooting means causes a failure signal corresponding to the result of troubleshooting to be transmitted from said communication means to the multiplex nodes when a failure is detected.

6. A multipath transmission system according to claim 1, wherein said troubleshooting means discriminates specific multiplex nodes requiring a failure signal in accordance with the result of troubleshooting, and causes the failure signal corresponding to the result of troubleshooting to be transmitted from the communication means to the specific multiplex nodes only.

7. A multipath transmission system according to claim 5, wherein said failure signal contains address data indicative of a local station, address data indicative of a destination, data length, and data corresponding to the result of troubleshooting.

8. A multipath transmission system according to claim 1, wherein said communication means and said troubleshooting means are arranged at a junction situated adjacent an instrument panel of an automobile and are connected with a plurality of wire harnesses when the multipath transmission system is used in the automobile.

9. A multipath transmission system according to claim 6, wherein said failure signal contains address data indicative of a local station, address data indicative of a destination, data length, and data corresponding to the result of troubleshooting.

10. A multipath transmission system including transmission lines and a plurality of multiplex nodes connected to the transmission lines and constituting at least two multiplex networks, and a specific multiplex node connected to said at least two multiplex networks, said specific multiplex node being used for carrying out multipath transmission of signals between the multiplex networks and for troubleshooting the multiplex networks, said specific multiplex node comprising:

communication means including a first driver/receiver circuit for carrying out the multipath transmission when abnormality has occurred in one of the multiplex networks, and a second driver/receiver circuit for carrying out the multipath transmission when no abnormality is occurring in the multiplex networks; and troubleshooting means for periodically controlling switching between the first driver/receiver circuit and the second driver/receiver circuit, and for troubleshooting the multiplex networks when the multipath transmission fails to be executed through the second driver/receiver circuit.

11. A multipath transmission system according to claim 10, wherein said troubleshooting means periodically transmits specific signals to the connected transmission lines, receives reception response signals from the multiplex nodes corresponding thereto, and troubleshoots the multiplex nodes depending on the presence of the reception response signals received.

12. A multipath transmission system according to claim 10, wherein said troubleshooting means periodically causes specific signals to be transmitted from the multiplex nodes, and troubleshoots the multiplex nodes depending on the presence of the specific signals transmitted.

13. A multipath transmission system according to claim 10, wherein said troubleshooting means causes a failure signal corresponding to the result of troubleshooting to be transmitted from said communication means to the multiplex nodes when a failure is detected.

14. A multipath transmission system according to claim 10, wherein said troubleshooting means discriminates specific multiplex nodes requiring a failure signal in accordance with the result of troubleshooting, and causes the failure signal corresponding to the result of troubleshooting to be transmitted from the communication means to the specific multiplex nodes only.

15. A multipath transmission system according to claim 10, wherein said communication means and said troubleshooting means are arranged at a junction situated close to an instrument panel of an automobile and are connected with a plurality of wire harnesses when the multipath transmission system is used in the automobile.

16. A multipath transmission system according to claim 13, wherein said failure signal contains address data indicative of a local station, address data indicative of a destination, data length, and data corresponding to the result of troubleshooting.

* * * * *

UNITED STATES PATENT AND TRADEMARK OFFICE
CERTIFICATE OF CORRECTION

PATENT NO. : 5,307,340
DATED : April 26, 1994
INVENTOR(S) : Kiyoshi Inoue, et. al.

It is certified that error appears in the above-indentified patent and that said Letters Patent is hereby corrected as shown below:

Title page, item [73], Assignee: add Mazda Motor Corp., of Hiroshima, Japan--.

Signed and Sealed this

Twenty-fourth Day of October, 1995

Attest:

BRUCE LEHMAN

Attesting Officer

Commissioner of Patents and Trademarks